L. G. SALEMBIER.
NON-SKIDDING DEVICE.
APPLICATION FILED AUG. 24, 1916.
1,324,069.
Patented Dec. 9, 1919.
2 SHEETS—SHEET 1.
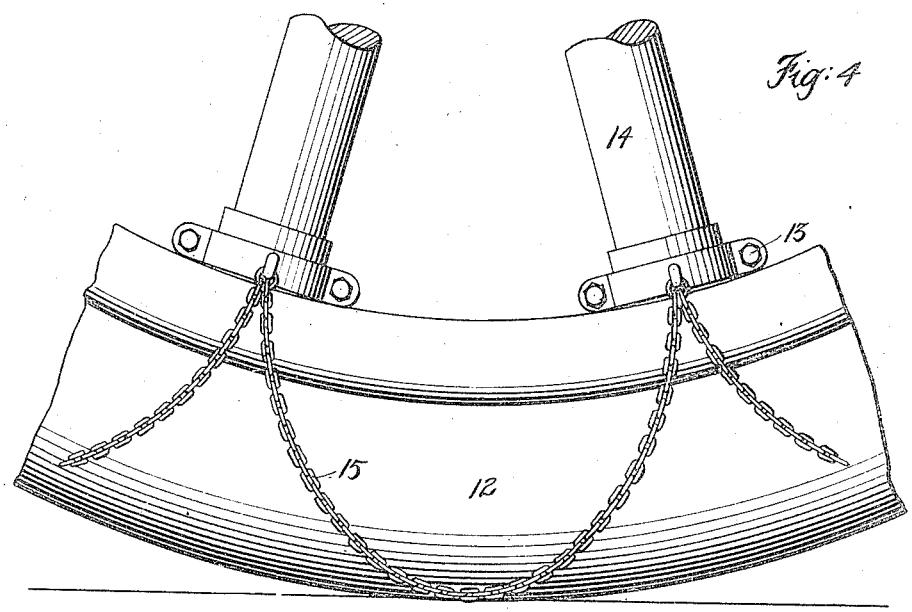
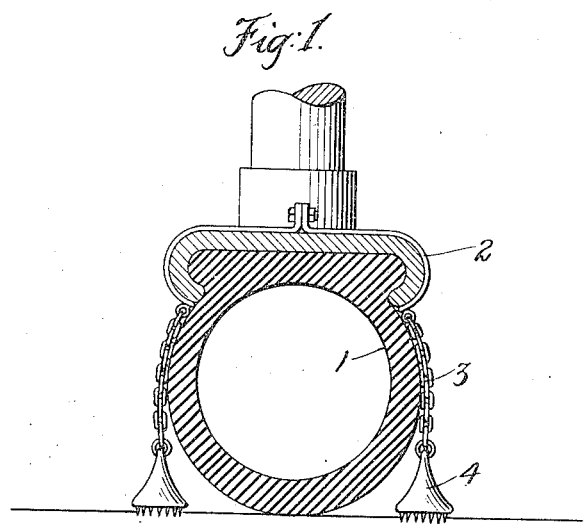

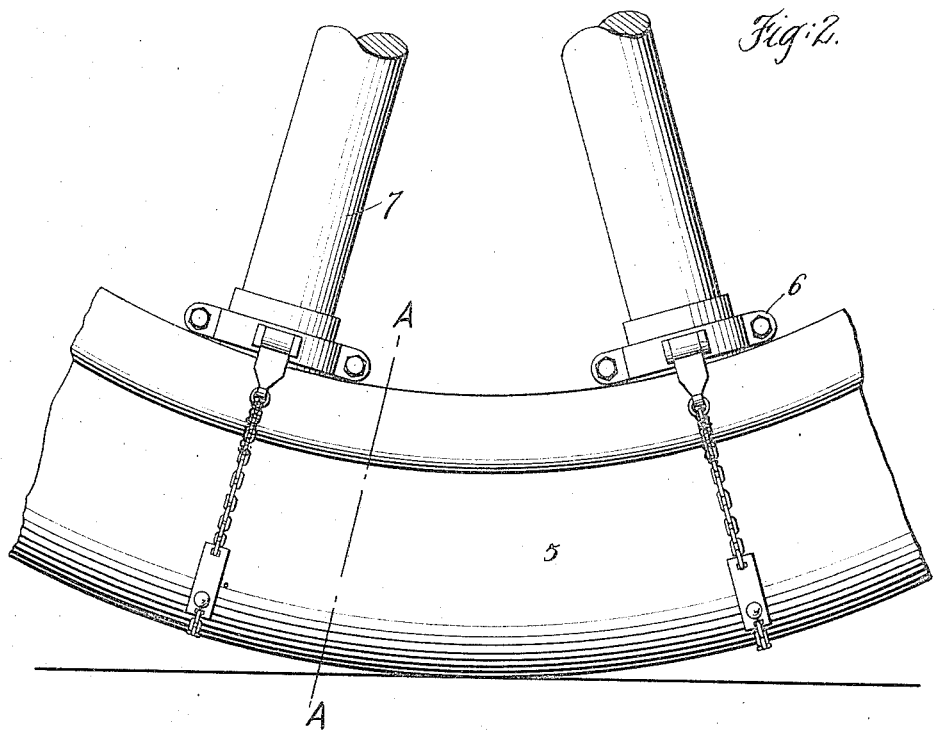
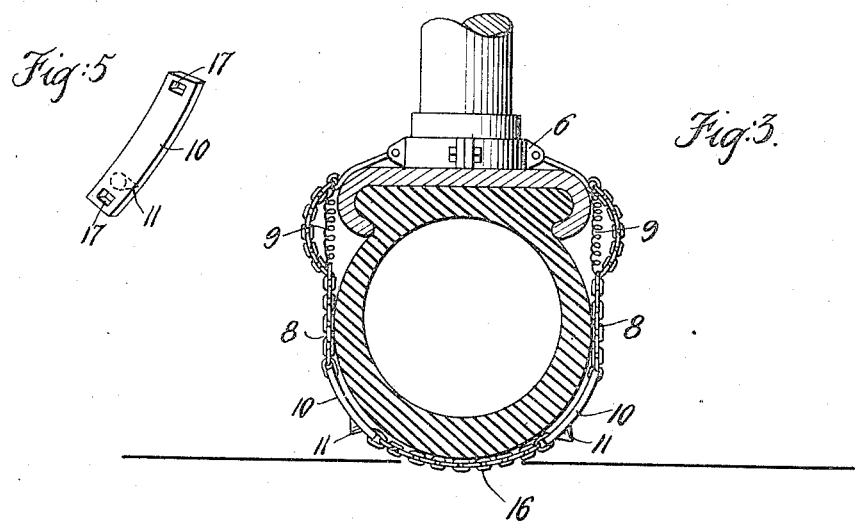

UNITED STATES PATENT OFFICE.

LUCIEN G. SALEMBIER, OF TENAFLY, NEW JERSEY.

NON-SKIDDING DEVICE.

1,324,069.  Specification of Letters Patent.  Patented Dec. 9, 1919.

Application filed August 24, 1916. Serial No. 116,573.

*To all whom it may concern:*

Be it known that I, LUCIEN G. SALEM-BIER, a citizen of the United States, and a resident of the city of Tenafly, county of Bergen, and State of New Jersey, have invented certain new and useful Improvements in Non-Skidding Devices, of which the following is a specification.

My invention relates to non-skidding devices for tires, and has particularly for its object to provide a construction whereby the tire is prevented from skidding laterally while the vehicle is traveling over a slippery road surface. In the preferred embodiment of my invention I also reduce circumferential slipping to a minimum.

Heretofore in non-skidding devices there has been very little, if any, advantage taken of the fact that the relative movement between the tire and the non-skid device may be used to bring into action means to prevent a further lateral movement of the tire relative to the road.

I make use of this relative movement by permitting the tire in its lateral course to bring into action and to mount upon an armored tread or non-skid member, and because of the weight of the vehicle, force the pointed projections of said tread to embed themselves into the road surface, thereby preventing further lateral motion of the tire.

For a full understanding of my invention, reference is to be had to the following description and accompanying drawings, in which—

Figure 1 shows a sectional view through a rim and a tire with my device attached thereto.

Fig. 2 shows a side elevational view of a rim and tire with the preferred modification of my device attached thereto.

Fig. 3 shows a sectional view through A—A of Fig. 2.

Fig. 4 shows a side elevational view of a rim and tire with a modification of my device attached thereto.

Fig. 5 shows a detail perspective view of one of the tread members shown in Figs. 2 and 3.

Referring in detail to the drawings, 1 illustrates a pneumatic tire mounted upon a rim in any suitable manner, upon which rim is mounted by means of a clip 2 and a chain 3, tread member 4, of any suitable material, and provided with pointed projections of metal.

In Figs. 2 and 3, which show the preferred embodiment of my invention, I show at 5 a tire upon the rim of which is mounted by means of annular clamps 6, affixed to the spokes 7, the chain 8. The chain 8 is held taut and in contact with the surface of the tire by means of spiral springs 9, attached to the clamp 6 and the chain 8 intermediate its ends as shown. The chain 8 thus supports the metallic tread members 10, which may be of the contour shown and adapted to the curvature of the tire, and with the springs 9 forms a flexible and extensible connection which is adapted to bring the non-skid member to the normal inoperative position illustrated in Fig. 3 and to permit transverse circumferential movement thereof with respect to the tire, thereby bringing the non-skid member into an operative position. The tread members 10 are provided with pointed projections 11 and are interconnected by means of a chain 16, which in addition serves as a preventive of circumferential slip.

Another modification of my invention is shown in Fig. 4, in which at 12 I show a tire upon the rim of which is mounted by means of annular clamps 13, affixed to the spokes 14, festoons of chain 15, which act both as non-skid members and the flexible supports therefor in the manner previously described when the tire mounts upon the chain in its lateral course.

At 17 of Fig. 5 I show slots in the tread member 10, through which the chain 8 and the chain 16 may be linked, thereby securing interconnection between the tread members.

My device operates as follows:—

When a vehicle equipped with my invention is traveling over a slippery road surface, and by reason of some lateral momentum given to the vehicle, such as is effected by turning out from or toward the curbing or rounding a corner, should the vehicle start to skid by reason of a lateral slip of the tire over the slippery surface, this movement of the tire will cause the non-skid member to be engaged between the tire and the road. The tire will mount upon the tread member because of this lateral movement, thereby forcing the projections into the surface of the road and preventing the vehicle from further lateral motion.

It is obvious that many modifications may be made without departing from the spirit of my invention, and I, therefore, do not intend to confine myself to the particular forms shown and described.

What I claim is:

1. In a device of the character described, a rim, a tire mounted thereon, a plurality of non-skid members each depending from said rim by a single flexible support and having a free end capable of substantial movement with respect to the tire to both sides of its normal position in a plane substantially parallel to the plane of the tire, and also transverse to said first-mentioned plane.

2. In a tire of the character described, a rim, a tire mounted thereon, a plurality of non-skid members each depending from said rim by a single flexible support and having a free end provided with pointed projections and capable of substantial movement with respect to the tire to both sides of its normal position in a plane substantially parallel to the plane of the tire, and also transverse to said first-mentioned plane.

LUCIEN G. SALEMBIER.